METHOD AND MEANS FOR TRANSMITTING ELECTRIC SIGNALS

Filed March 3, 1950 3 Sheets-Sheet 1

Inventor
Francois H. Raymond
By Ralph B. Stewart
Attorney

March 16, 1954 F. H. RAYMOND 2,672,516

METHOD AND MEANS FOR TRANSMITTING ELECTRIC SIGNALS

Filed March 3, 1950 3 Sheets-Sheet 2

Inventor
Francois H. Raymond
By Ralph B. Stewart
attorney

METHOD AND MEANS FOR TRANSMITTING ELECTRIC SIGNALS

Inventor
Francois H. Raymond
By Ralph B. Stewart
attorney

Patented Mar. 16, 1954 2,672,516

UNITED STATES PATENT OFFICE 2,672,516

METHOD AND MEANS FOR TRANSMITTING ELECTRIC SIGNALS

François Henri Raymond, Vesinet, France, assignor to Societe d'Electronique et d'Automatisme, Paris, France, a corporation of France Application March 3, 1950, Serial No. 147,351

Claims priority, application France March 7, 1949

5 Claims. (Cl. 179—15)

Figures 1, 4:
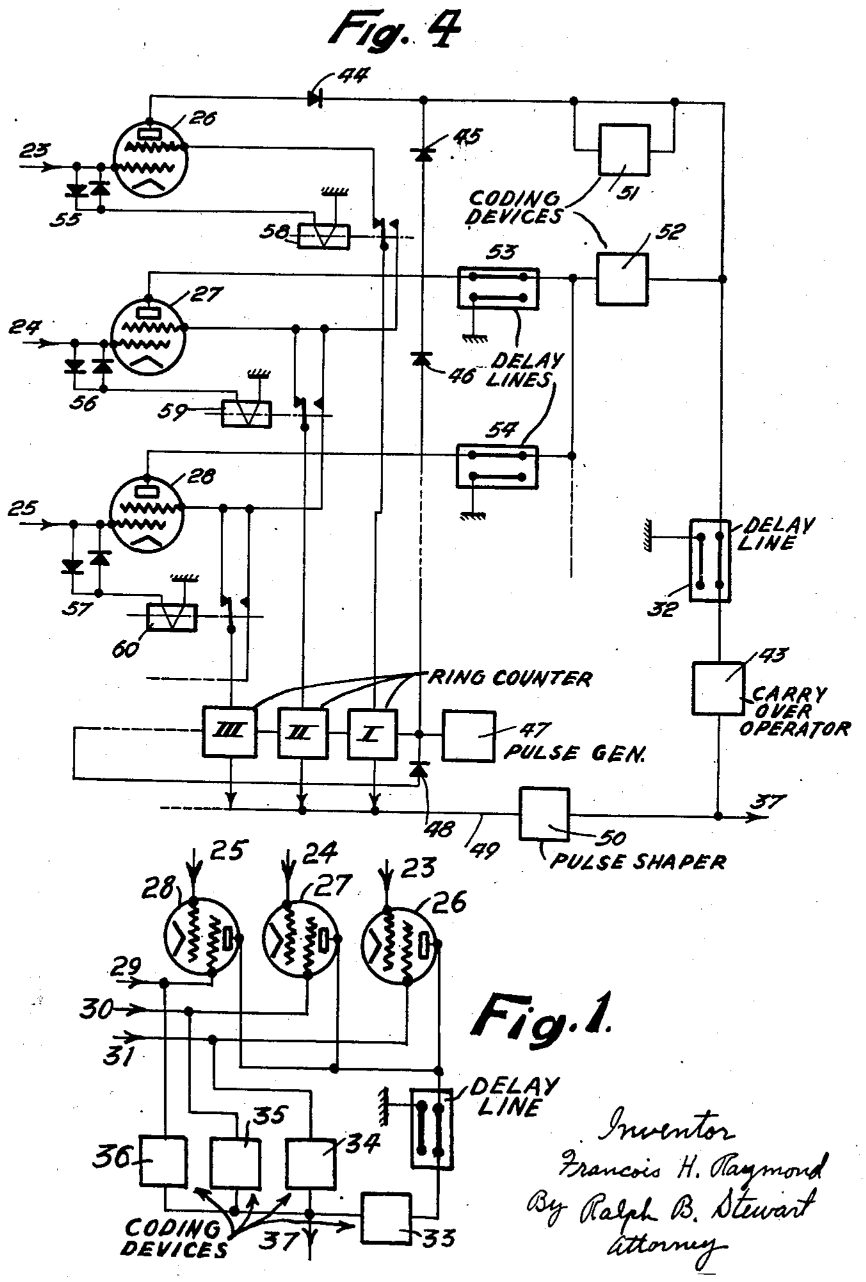

The present invention relates to a method and means for transmitting electric signals in those types of intelligence transferring systems in which signals from a plurality of individual channels are transmitted successively over a common transmission channel, and at the receiving station, or any other desired site, are distributed in turn to their respective individual channels. In earlier known systems a synchronized timing distributor has been used at the location where the individual channels and the common transmission line meet, thus introducing a cross talk level between channels too high to be eliminated, but the present invention dispenses with the timing distributor and therefore dispenses with the disturbing cross talk.

The invention relates to systems of the above-mentioned type in which, threshold circuits, or so-called "gates," are used for opening the individual channels in turn to the common signal transmission channel, both at a transmitter and at a receiving point. The gate for a given channel is normally biased to stay closed until a gating impulse of a predetermined amplitude is applied to it to open it for passage of its proper intelligence signal. Different amplitude levels are assigned to the gates in the different individual channels, so that the gates are opened in the order of the amplitude levels. In earlier known systems "stepped" voltages have been used to open the gates in a predetermined sequence depending on the consecutive magnitudes of the stepped voltages, but the present invention makes it possible to open the gates in any desired order instead of in a predetermined set sequence. That is, this invention gives complete freedom, whenever this is desired, regarding the transmission sequence of signals corresponding to the different channels.

The features which make possible the avoidance of the timing distributor and the flexibility of channel sequence, are the transmission of a pilot signal before the intelligence signal from each channel and the application either to the pilot signal itself, or to the channel intelligence signal itself, of a code that tells what amplitude level voltage will open the proper channel gate. That is, the height of the amplitude level required for opening the desired gate is expressed, say, in numerical code, and this coded number is made a part of the pilot signal or of the intelligence signal of the particular channel whose gate will open at the amplitude level represented by the coded number.

An object of the invention, therefore, is to transmit along with each signal from a particular channel its own pilot signal and a coded indication of the amplitude level at which the channel gate operates.

A corresponding object is to decode at the distribution point, each pilot signal and its associated channel intelligence signal so as to get an indication of the amplitude level at which the channel gate operates.

Specifically, it is an object of the invention to apply the coded amplitude level signal to the pilot signal. Specifically also it is an object to apply the coded amplitude level signal to the channel intelligence signal itself.

The invention finds application in multiplex signaling systems including multiplex communication systems of the time-division type in which a channel signal may be a series of "samples" of varying magnitude of the voice wave to be transmitted. The prior art shows that the channel signals of one channel in this case may be a series of trains of impulses, each train designating in numerical code a particular magnitude of signal current. The coded channel signal in this case and the coded amplitude level signal telling what channel gate must be opened, may be combined for transmission over the common transmission line for decoding at the distribution point.

The invention also finds application in computing networks in which partial calculating results which are the channel signals, stand for mathematical magnitudes; these must be transferred to other places in the calculating machine as a succession of trains of impulses and the trains must then be distributed so that the mathematical magnitudes may again be acted on in other calculating channels.

In multichannel systems of the above-mentioned time division type it is possible to signal by the use of position modulated impulses or by code impulses, since only one amplitude serves for the transmission of all signals.

The present invention while maintaining the advantages of the modulation means mentioned, does away with inconveniences of previous systems by assigning as many amplitude levels as there are individual channels, making the particular amplitude level a characteristic of the channel, introducing in code an indication of the assigned amplitude level for each message signal of that channel, decoding said indication at the point of distribution and using the decoded result to open passage into the selected channel, and eliminating the amplitude level indication at the point which the message signal is passed to its selected channel.

Figures 1 to 4 show illustrative embodiments of circuits for producing signals in a multiplex transmission system, which said signals are precoded in amplitude levels according to the preceding practice. For the sake of simplicity, three channels only are considered, though the possibility of extension to any greater number of channels is quite plain.

In the arrangement of Fig. 1, the three information signals are brought on the three channels 23, 24, 25 and applied onto tubes 26, 27, 28; if wanted, a previous amplitude compression may have taken place so that these signals will have predetermined maximum amplitude levels. Said tubes 26, 27, 28 are normally blocked and are unblocked in sequence by timing impulses applied through wires 29, 30 and 31 onto for example, their screen-grids. The outputs of these tubes are connected in common, through a delaying line (such as an artificial line section) 32 to an encoder device 33 which converts each amplitude modulated impulse, into a coded impulse train.

Further, each timing impulse is respectively applied onto an encoder 34, 35 or 36, for instance of the type described in French Patent No. 988,021 which converts it into a coded pulse train carrying the level amplitude of the channel to which said monitor impulse is related. Each monitor signal thus coded, shall be applied onto the common transmission conductor 37 through suitable dimensioning of the delaying line 32, before each information coded signal and at a predetermined interval with respect to the said information signal.

Figure 2:
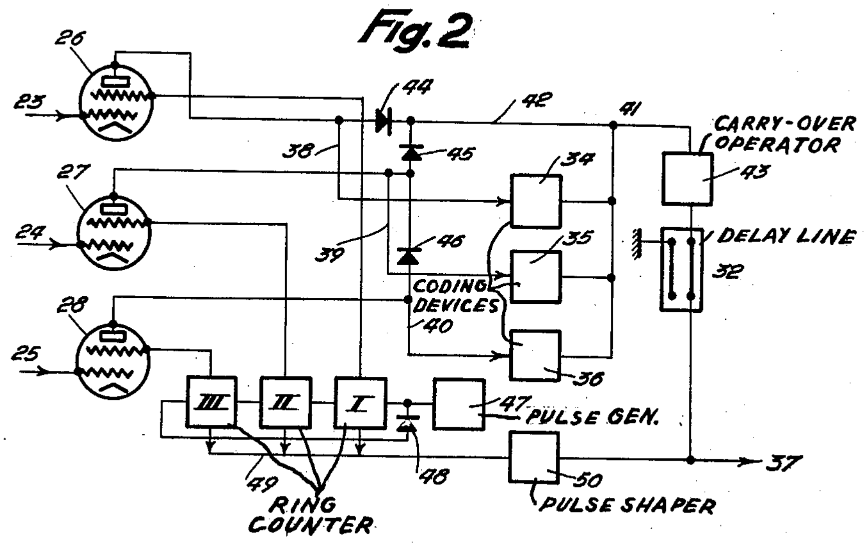

The operation process is analogous in Fig. 2, but in said arrangement, the coded train of impulses representing the predetermined amplitude levels, are added to the information signals themselves instead of remaining distinct and being transmitted as distinct monitor signals. For this purpose, each of the outputs of tubes 26 to 28 includes a branch circuit which, as shown in 38, 39, 40, reads the codes applied to encoding quadripoles 34, 35, 36. The coded trains thus derived are added, at 41, by mixing followed by rectification through a carry-over operator at 43, to the amplitude-modulated pulses from tubes 26, 27, 28. As an alternative, the quadripoles 34 to 36 may be replaced by amplitude encoders and the process of rectification by carry-over established at 43 ensures a train of impulses coded both in response to the amplitude of the information signal and the amplitude level of its corresponding channel.

Connections linking the outputs of tubes 26 to 28, to encoders 34 to 36, are one way as indicated at 44, 45 and 46, in order to avoid undue interferences between channel outputs.

In Fig. 2, also, is indicated a preferred arrangement for producing the monitor pulses: it comprises an impulse generator 47 which delivers its impulses at the input of a ring counter I—II—III, in cascade connection closed by a one way feedback 48. The output pulses of these stages are applied on one hand onto screen-grids of tubes 26 to 28, and on the other, onto a shaping circuit 50 which apply to them a characteristic conformation before delivering the said reshaped pulses to the output transmission service way 37, in order that each monitor signal should precede its corresponding information/amplitude level signal delayed at 32.

In the following, monitor signals will be considered constituted by a pair of short pulses spaced by a time interval $\epsilon$ shorter than the interval $\theta$ between each pair of such signals, and each pair of pulses of the information coded signal. Such a design may be easily obtained by device 50 comprising two service ways, one direct, the other delayed from $\epsilon$, and both feeding the service way 37 in the same way as they are fed in common by the conductor 49.

Figure 3:
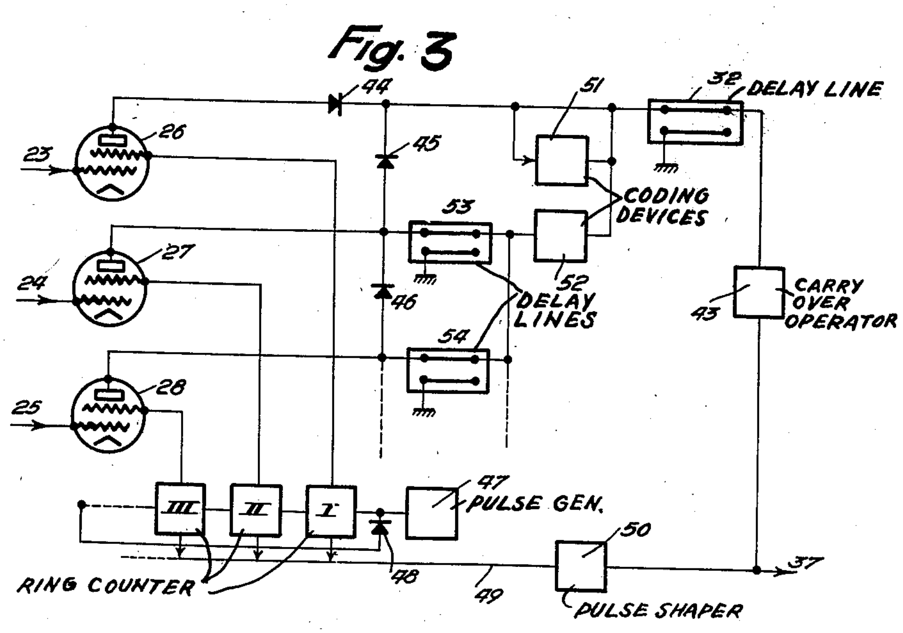

In the arrangement shown in Fig. 3, only two encoders are provided for producing the pulse coded trains carrying the predetermined amplitude levels; said arrangement will have its advantage in multiplex transmission systems of a relatively high number of channels. These two encoders are indicated at 51 and 52. The encoder 51 receives every output signal of the channel tubes 26, . . . and is adjusted to supply to the delaying line 32, a train of pulses coded with the lower amplitude level, e. g., the channel No. 1; encoder 52 corresponds to the producing of a pulse train coded at an arbitrary level amplitude and its output is connected to that of encoder 51. Its input, however, is fed by signals resulting from the delay in the circuits, as indicated at 53, 54, . . . of outputs of the other channel tubes; and said delay circuits (artificial line sections) present increasing delay values as they are fed by channel tubes of higher rank in the considered group. Hence, said encoder, 52, when energized by the tube of the second channel, will deliver a pulse signal (a single pulse may be sufficient) which is taken as a signal of order 2 with respect to the signal put forth by encoder 51 (also a single impulse may be sufficient for this encoder); when energized by channel No. 3, the encoder 52 will deliver a signal of order 3 with respect to the signal delivered by the encoder 51, also energized by the same channel; and so on, it is understood here, that the first impulse moment of the encoder 52 is delayed by an interval of time $\theta$ with respect to the first impulse moment from 51, according to the mathematical meaning of the word when considering the numerical development of any number with respect to a definite radix of numeration.

By said arrangement, any amplitude level relative to any channel is produced in the form of a coded pulse train, as a result of the described association of the two encoders 51—52 and the associated delaying lines 53, 54. . . .

In any multiplex transmission system, and especially if the number of channels is great it is desirable to transmit only those effective signals which appear in the various channels and to omit those of said channels which are uneffective at any time. The provision of the method of transmission according to the present invention enables such a kind of operation since it is no longer a prerequisite condition to maintain fixed recurrence in the sequence of transmission of said channels.

Fig 4 shows a simple way of obtaining such a selection, in which passing-through from an active channel to another active channel is ensured, however many intermediate channels may be inactive at the time concerned.

To this purpose, each of the incoming channels 23, . . . is provided wtih a signal detector 55, 56, 57 . . . i. e. made of a full-wave rectifier, the output of which acts when activated, on a relay 58, 59, . . . These relays however shown as electro-mechanical relays, will in practice be valves or tubes, or better flip-flop stages. When the relay is excited each operating contact, effectively connects the corresponding channel tube onto the conductor applying the relative unblocking impulse; when the relay is idle because of no information signal, the rest or back contact connects each channel tube to the conductor applying the relative unblocking immediately prior impulse. In this way if channels 23 and 24 are not operative (Figure 12) the counterstage I delivering impulses is connected by means of the rest contacts of relays 58 and 59 onto the tube 25 which will be unblocked by the first impulse; when the second impulse will take place, said tube will again be unblocked by the relay rest contact, and unblocked again by the third impulse by the operating contact of its own relay. When no information signals appear on channels 23 and 24, the information signal from channel 25 will be permanently analysed and sampled for transmission. However, the transmitted signals will always be coded according to the amplitude level relative to said third channel, as said signals will permanently be produced by the delaying line 54 and encoders 51 and 52 as explained with respect to the arrangement of Fig. 3 reproduced in Fig. 4.

Figures 5, 6:
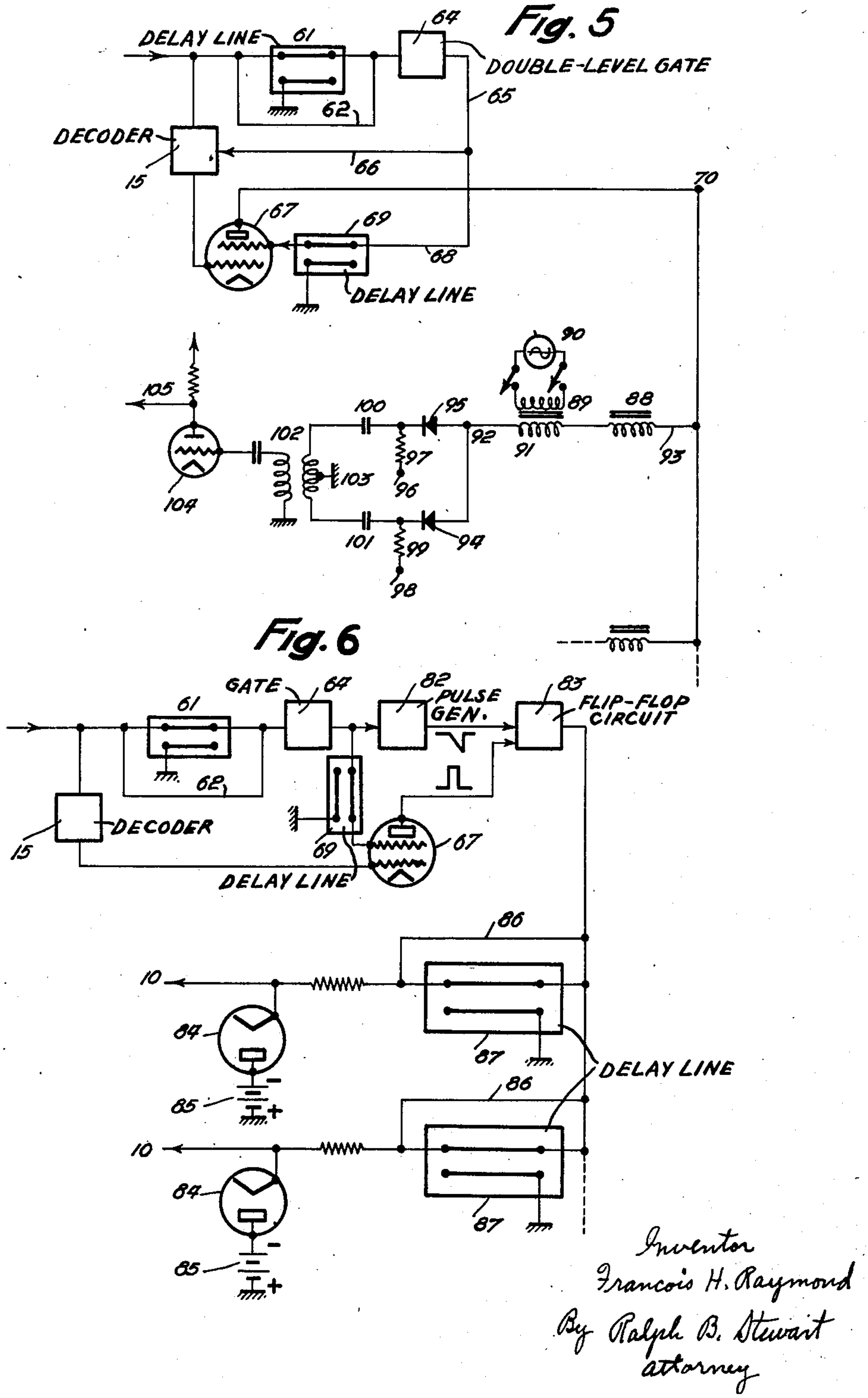

More detailed arrangements are shown, in electronical arrangements, in Figs. 5 and 6, mainly for explaining what is meant hereinbefore by threshold and amplitude band-pass circuits, as well as to state the separation circuit for the monitor signals.

Fig. 5 shows a system in which the pulses are distributed to their respective channels by means of differential amplitude discriminators 88—105 of well known type.

The purpose of the decoding device is to give to the message signal the level which corresponds to the channel along which the message is to be directed. The indication of that level is given by the amplitude of the signal which can precede the message signal or be superposed on it. Therefore, at 70 in Fig. 5 is obtained the message signal with a predetermined amplitude and the problem is to separate the N levels, assigned to the N channels.

For this purpose, each channel is characterized by an amplitude gate of $E_2$—$E_1$, and the device performing the discrimination is shown at Fig. 5 from reference 83 to reference 105.

After the signals pass through the coil 88, a sinusoidal modulation is superposed upon the impulses by source 90 acting through transformer windings 89 and 91; the amplitude of this modulation being possibly less than, or at the most equal to the width of the gate $E_2$—$E_1$. Therefore, at point 92, the various signals come in with different amplitudes according to the various channels. For example, the signal for channel $Np-1$ may have an amplitude less than $E_1$; the signal for channel $N-p$ an amplitude between $E_1$ and $E_2$, and the signal for channel $N-p+1$ an amplitude greater than $E_2$.

At the point 92 are connected in parallel two rectifiers 94 and 95, polarized by the voltages $E_2$ and $E_1$. The unit is looped on a transformer 102, the primary winding of which has its middle tap grounded and the secondary winding of which is tuned to the frequency of the sinusoidal wave superposed on the impulses.

When signals of the type $Np-1$ come in at 92, the rectifiers 94 and 95 are non-conductive and present a high series impedance in bridges 95—97 and 94—99. Therefore, no signal is transmitted to transformer 102.

When signals of the type $N-p$ come in, on the contrary, rectifier 95 is conductive and allows the passage of the wave train superposed on the impulse; the wave may be found again at point 105, amplified by the tuned circuit.

After detection, the message signal is found again and may be decoded and sent into the corresponding $N-p$ channel.

When signals of type $N-p+1$ come in, the rectifiers 94 and 95 are conductive, and at the terminals of condensers 100 and 101 are found two identical signals, the action of which is nil upon the secondary winding of the transformer 102.

The result is the chocking or blocking of the message signal in channel $N-p+1$, for example.

In this way, the amplitude assigned to channel $N-p$ has been selected and the information has been sent along the channel corresponding to that amplitude.

In the alternative embodiment shown in Fig. 6, the monitor signal energizes a sharp parabolic generator 82 being used, as before, to produce in duration the decoded information signal. The two voltages thus produced are applied onto a device 83 such as a flip-flop circuit; the forefront of the information signal, appearing as an amplitude-modulated pulse, produces a pulse, when the potentials of said information pulse and said sharp wave are equal; they annul each other and produce repeated operation of the flip-flop 83, hence a second pulse is produced the time interval of which, depends upon the amplitude of said information pulse, or is closely related thereto.

Each pair of pulses so produced, the time interval or separation of which is a measure of the magnitude of the carried information, is parallel applied onto the selection parallel ways including each threshold circuits (such as shown by the diode tubes 84, biassed at 85). Each of these channels includes in fact, at its input, a circuit for coincidence selection, as shown at 86—87, identical to the coincidence circuit 61—62 of Fig. 5 but in which the delaying line section 87 is established relatively to the various amplitude levels characterizing the various transmission channels transmission hence in relation with pulses intervals in each pair generated as described.

What I claim is:

1. A multiplex intelligence transmission system of the time division type in which intelligence signals transmitted over a common channel are selectively distributed into a plurality of individual channels, comprising means for producing pilot signals and inserting them between the intelligence signals in said common channel so that each pilot signal is adjacent in time to a corresponding intelligence signal, means at the distribution point for generating a plurality of different amplitude-level voltages one for each channel, normally closed gating means for the individual channels selectively responsive to said different amplitude-level voltages to open the respective channels, means under control of said pilot signals and their associated time-adjacent intelligence signals for selecting said amplitude-level voltages to open said gating means.

2. A multiplex intelligence transmission system of the time division type in which intelligence signals transmitted over a common channel are selectively distributed into a plurality of individual channels, comprising means for producing pilot signals and inserting them between the intelligence signals in said common channel so that each pilot signal is adjacent in time to a corresponding intelligence signal, means at the distribution point for generating a plurality of different amplitude-level voltages one for each channel, normally closed gating means for the individual channels selectively responsive to said different amplitude-level voltages to open the respective channels, means for coding said pilot signals to select the amplitude-level voltages corresponding to the channels to which their adjacent intelligence signals are to be distributed, and means under the combined effect of said coded pilot signals, said intelligence signals and said selected amplitude-level voltages for selectively opening said gating means.

3. A multiplex intelligence transmission system of the time division type in which intelligence signals transmitted over a common channel are selectively distributed into a plurality of individual channels, comprising means for producing pilot signals and inserting them between the intelligence signals in said common channel so that each pilot signal is adjacent in time to a corresponding intelligence signal, means at the distribution point for generating a plurality of different amplitude-level voltages one for each channel, normally closed gating means for the individual channels selectively responsive to said different amplitude-level voltages to open the respective channels, means for coding said pilot signals to indicate for each pilot signal the amplitude-level voltage corresponding to the channel to which the adjacent intelligence signal is to be distributed, means for decoding said pilot signals at the distribution point to derive the indicated amplitude-level voltage, and means for adding the derived amplitude-level voltage to the associated intelligence signal, for operation of the appropriate gating means.

4. A multiplex intelligence transmission system of the time division type in which intelligence signals transmitted over a common channel are selectively distributed into a plurality of individual channels, comprising means for producing pilot signals and inserting them between the intelligence signals in said common channel so that each pilot signal is adjacent in time to a corresponding intelligence signal, means at the distribution point for generating a plurality of different amplitude-level voltages one for each channel, normally closed gating means for the individual channels selectively responsive to said different amplitude-level voltages to open the respective channels, means for coding said intelligence signals to select the amplitude-level voltages corresponding to the channels to which said intelligence signals are to be distributed, and means under the combined effect of said coded intelligence signals, said pilot signals and said selected amplitude-level voltages for selectively opening said gating means.

5. A multiplex intelligence transmission system of the time division type in which intelligence signals transmitted over a common channel are selectively distributed into a plurality of individual channels, comprising means for producing pilot signals and inserting them between the intelligence signals in said common channel so that each pilot signal is adjacent in time to a corresponding intelligence signal, means at the distribution point for generating a plurality of different amplitude-level voltages one for each channel, normally closed gating means for the individual channels selectively responsive to said different amplitude-level voltages to open the respective channels, means for coding said intelligence signals to indicate for each intelligence signal the amplitude-level voltage corresponding to the channel to which the adjacent intelligence signal is to be distributed, means for decoding said intelligence signals at the distribution point to derive the indicated amplitude-level voltage, and means for adding the derived amplitude-level voltage signal to the associated intelligence signal for operation of the appropriate gating means.

FRANÇOIS HENRI RAYMOND.

References Cited in the file of this patent

UNITED STATES PATENTS

| Number | Name | Date |
|---|---|---|
| 2,531,817 | Houghton | Nov. 28, 1950 |
| 2,543,738 | Houghton | Feb. 27, 1951 |